UNITED STATES PATENT OFFICE.

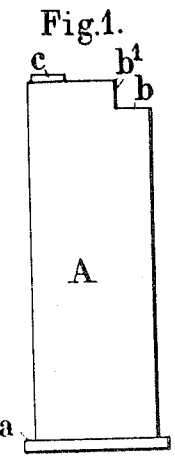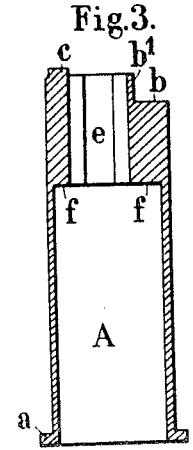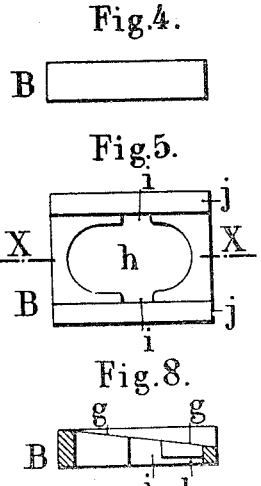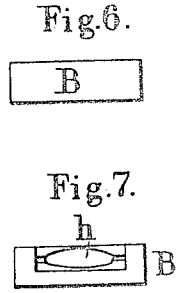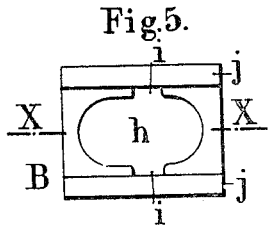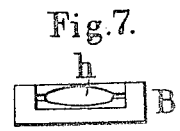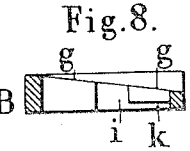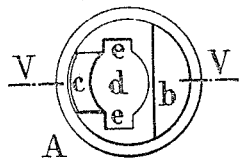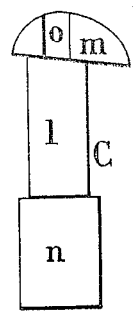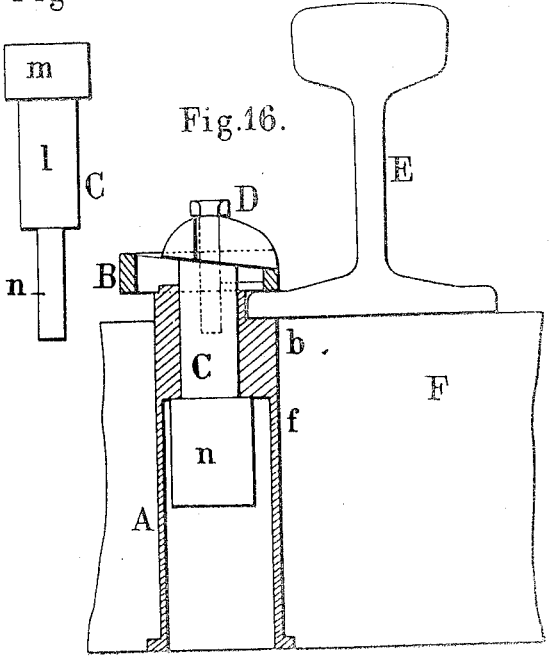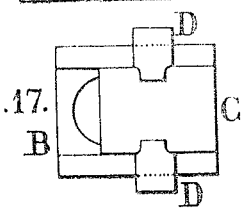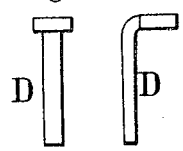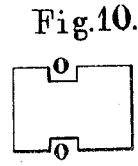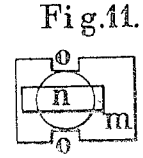

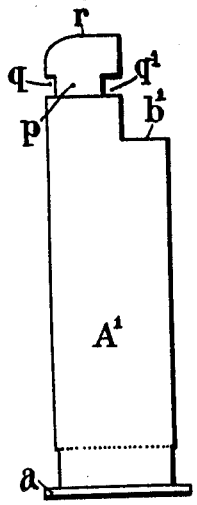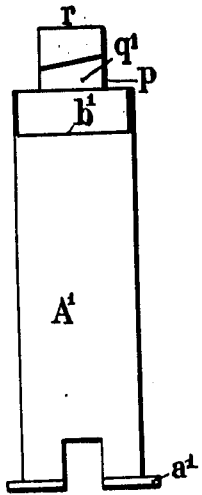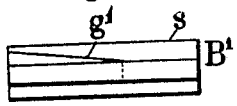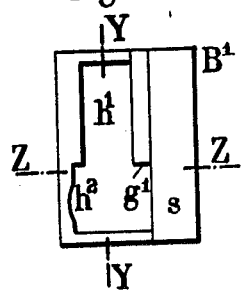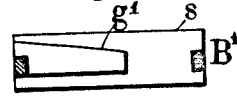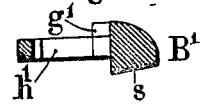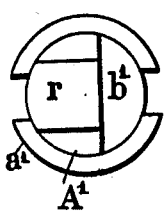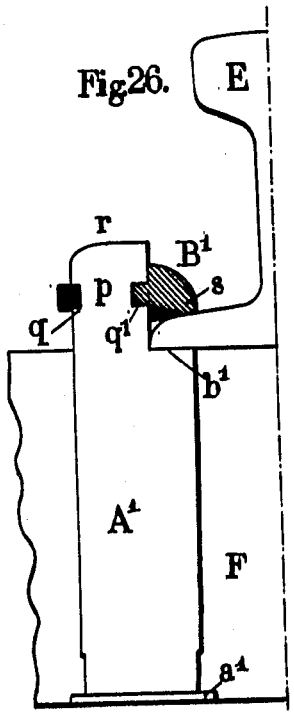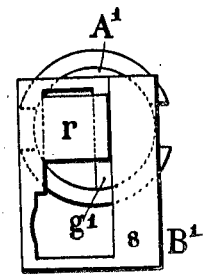

LÉON FAUQUÉ, OF ST.-GERMAIN-EN-LAYE, FRANCE, ASSIGNOR TO SOCIÉTÉ UNIVERSELLE DES APPAREILS CONTRÔLEURS, OF PARIS, FRANCE.

RAIL-FASTENING.

1,087,004.  Specification of Letters Patent.  Patented Feb. 10, 1914.

Application filed May 8, 1913. Serial No. 766,280.

*To all whom it may concern:*

Be it known that I, LÉON FAUQUÉ, of 52 Rue de Louviers, St.-Germain-en-Laye, (Seine-et-Oise,) France, have invented an Improvement in Rail-Fastenings, of which the following is a full, clear, and exact description.

The rails of railway tracks are generally secured to the wooden sleepers by screw spikes, the resistance of which to the pulling or tearing stress decreases rapidly under the action of the strains determined by the passage of trains traveling at a high speed and may sometimes become insufficient for insuring the holding of the rail on its bearings or supports; thenceforth the security of the track is compromised and accidents may happen.

The present invention overcomes this serious inconvenience by insuring the fixation of the rail by means of a device offering a resistance to the pulling stress always equal to the breaking strain of the metal of which it is constituted, allowing, without any screw threading, a much more secure clamping than that of the screw spike and opposing any sinking of the rail on its supports, all these conditions being necessary for insuring the fixation of the rails on the wooden sleepers made of any species of wood.

This invention will be described hereafter with reference to the accompanying drawing, in which:

Figure 1 shows apart in elevation, a cylindrical socket constituting a part of this device; Fig. 2 is a plan view thereof; Fig. 3 is a vertical section made according to line V—V of Fig. 2; Fig. 4 shows apart, in elevation, a wedge which is a part of said device; Fig. 5 is a plan view thereof; Fig. 6 is an end view of said wedge seen from the side of the head of the latter; Fig. 7 is an end view from the side of the nose of the wedge; Fig. 8 is a section made on line X—X of Fig. 5; Fig. 9 shows apart, in elevation, a cramp on which is a part of the present device; Fig. 10 is a plan view thereof; Fig. 11 is an underside view of said cramp; Fig. 12 is a side view of this cramp; Fig. 13 shows in elevation and detached a key which is a part of the device; Fig. 14 is a plan view thereof; Fig. 15 is a side view of the same; Fig. 16 illustrates in vertical section the present device in use; Fig. 17 is a plan view thereof; Fig. 18 shows in elevation and detached a cylindrical member which is a part of a modification of the above device; Fig. 19 is a plan view thereof; Fig. 20 is a side view thereof; Fig. 21 shows in end view, from the side of its nose, a wedge which is a part of this modification of the device; Fig. 22 is a plan view thereof; Fig. 23 is a side view thereof; Fig. 24 is a section made on line Y—Y of Fig. 22; Fig. 25 is a section made on line Z—Z of Fig. 22; Fig. 26 shows, partly in section, said modification of the device in use; Fig. 27 is a plan view thereof.

As illustrated in Figs. 1 to 17 of the drawings, the present device, adapted to secure the rails of railway tracks on the wooden sleepers, comprises: 1, a socket A; 2 a wedge B; 3, a cramp C; 4, a key D.

The socket A, which has a cylindrical shape, is hollow for a part of its height and is provided with a rib or flange $a$ at its lower part. At its upper part said socket is provided with a shoulder $b$ and a projection $c$. Within the socket A is formed an eccentric cylindrical recess $d$ with two diametrically opposed slots $e$. The under side of said recess and of the two slots constitutes a shoulder $f$ in the socket. The foot of the rail E lies on the shoulder $b$ of the socket and against the vertical part $b'$, while said socket is fitted in the sleeper F. The wedge B presents an inclined part $g$ having an oblong central recess $h$, two diametrically opposed vertical slots $i$ and two side ribs $j$; moreover, a lower cut away part $k$ allows of avoiding or passing the projection $c$ of the socket when fitting up the parts. The cramp C comprises a stem $l$, an eccentric head $m$ inclined parallel to the wedge and a T-shaped part $n$. The head $m$ is provided with two diametrically opposed slots $o$.

The socket A being fitted in the sleeper F, for securing the rail by means of the present device the edge of the rail foot is laid on the shoulder $b$ of said socket, then the cramp C is inserted in the wedge B, the eccentric part of the head $m$ being thus turned toward the nose of the wedge; this being done, the cramp C is fitted into the recess $d$ of the socket and the cramp and wedge are caused to rotate through a quarter of a revolution, so that the nose of the wedge should be turned toward the rail and that the T-member $n$ engages behind the inner shoulder $f$ of the socket; the parts being thus fitted together, the wedge B is driven toward the rail, two keys D are fitted into the corresponding grooves o i e of the members and the fixation of the rail is thus insured. The oblong recess h provided in the wedge B allows to drive it toward the rail, while the two ribs j between which is engaged the head m of the cramp prevent the latter from rotating. The projection c of the socket guides the wedge during the time the latter is driven toward the rail.

The keys D prevent the wedge B from moving backward and the cramp C from rotating. A single key would be sufficient for securing this device. When said device is to be removed, the parts are disengaged in the reverse order from that indicated above. Similar devices are arranged at intervals on both sides of the rails. The above device might be constructed as illustrated in Figs. 18 to 27 of the drawings. This modification of the device comprises a cylindrical member A' and a wedge B'. The cylindrical member A' is provided with a rim $a'$, an upper shoulder $b'$, a flange $p$, with lateral grooves $q$ and $q'$ and a head $r$.

The wedge B' comprises a nose $s$, the lower face of which is inclined parallel to the foot of the rail, an inclined part $g'$ and an oblong recess presenting two different openings $h'$ and $h^2$. The cylindrical member A' being placed into position in the sleeper F, for securing the rail E to the sleeper by means of this device, the edge of the rail foot is laid on the shoulder $b'$ of the member A', then the wedge B' is engaged on the head $r$ of said member A' and the wedge B' is driven so that inclined part $g'$ of the latter rubs on the inclined groove $q'$. During this displacement of the wedge, the nose $s$ of the latter has clamped the edge of the foot of the rail against the shoulder $b'$ of the member A' and the fixation of the rail is thus insured. When laying down this device, care should be taken to turn the nose $s$ of the wedge B' on the side opposite to the direction of running of the trains so that the slipping of the rails, resulting from the reaction, should cause the tightening of the wedge.

Claims:

1. A device for securing rails of railway tracks on the wooden sleepers, comprising a cylindrical member secured in the sleeper and a wedge engaged between a head integral with the cylindrical member and the foot of the rail.

2. A device for securing rails of railway tracks on the wooden sleepers, comprising a cylindrical member secured in the sleeper, a wedge, a cramp fitting in the wedge and cylindrical member, and two keys engaging the cylindrical member, wedge and cramp.

3. A device for securing rails of railway tracks on the wooden sleepers, comprising a cylindrical member secured in the sleeper and a wedge fitted in a groove provided under the head of the cylindrical member.

4. A rail fastening device comprising a socket adapted to be fitted in a sleeper or tie, a cramp receivable in said socket and having engagement with the latter to limit the upward movement of the cramp, the upper end of the cramp having a head, the head presenting an under shoulder, and a transverse wedge fitting the cramp below the head thereof and adapted to overlie and clamp a rail flange.

5. A rail fastening device comprising a socket adapted to be fitted in a sleeper or tie, and formed with a shoulder adapted to receive a rail flange, an element received in said socket and having engagement with the latter to limit the outward movement of said element, the upper end of the element having a head presenting an under shoulder, and a transverse wedge fitting the said element below the head thereof and adapted to clamp a rail flange against the shoulder of the socket.

6. A rail fastening device comprising a cramp, a means to secure the cramp to a sleeper or tie, a wedge adapted to engage the cramp and clamp a rail flange, and a key receivable in the cramp, the wedge having a member to be engaged by the key for locking the wedge against withdrawal from engagement with the cramp.

7. A rail fastening device, comprising a member adapted to be held to a sleeper or tie, there being means at the upper end of the said member to receive and engage a transverse rail-clamping device; in combination with said rail clamping device, the latter having a wedge surface to engage said means, the said member having a shoulder to underlie a rail flange.

The foregoing specification of my device for securing the rails of railway tracks in an invariable manner on the wooden sleepers signed by me this 25th day of April, 1913.

LÉON FAUQUÉ.

Witnesses:
HANSON C. COXE,
RENÉ THIRIOT.